United States Patent
Jeon et al.

(10) Patent No.: US 8,340,446 B2
(45) Date of Patent: Dec. 25, 2012

(54) APPARATUS AND METHOD FOR GENERATING CHAIN CODE

(75) Inventors: Jae-Wook Jeon, Gyeonggi-do (KR);
Dong-Kyun Kim, Gyeonggi-do (KR);
Jung-Uk Cho, Gyeonggi-do (KR);
Seung-Hun Jin, Gyeonggi-do (KR);
Dae-Ro Lee, Gyeonggi-do (KR);
Jong-Hyun Park, Gyeonggi-do (KR);
Ki-Hoon Kim, Gyeonggi-do (KR);
Thien-Cong Pham, Gyeonggi-do (KR)

(73) Assignee: Sungkyunkwan University Foundation for Corporate Collaboration, Gyeonggi-do (KR)

( * ) Notice: Subject to any disclaimer, the term of this patent is extended or adjusted under 35 U.S.C. 154(b) by 1341 days.

(21) Appl. No.: 12/036,015

(22) Filed: Feb. 22, 2008

(65) Prior Publication Data

US 2008/0310746 A1 Dec. 18, 2008

(30) Foreign Application Priority Data

Jun. 18, 2007 (KR) ........................ 10-2007-0059320

(51) Int. Cl.
*G06K 9/48* (2006.01)
(52) U.S. Cl. ........ 382/242; 345/170; 348/206; 348/498; 348/715; 375/240.12; 382/173; 382/199; 382/243; 382/298; 386/202; 386/240
(58) Field of Classification Search ........................ None
See application file for complete search history.

(56) References Cited

U.S. PATENT DOCUMENTS

| | | | | |
|---|---|---|---|---|
| 3,930,120 A | * | 12/1975 | Keller et al. | 348/206 |
| 4,109,276 A | * | 8/1978 | Hopkins et al. | 348/498 |
| 4,843,465 A | * | 6/1989 | Yuasa et al. | 375/240.12 |
| 5,319,460 A | * | 6/1994 | Kubo | 348/715 |
| 5,600,772 A | * | 2/1997 | Zhou et al. | 345/170 |

(Continued)

FOREIGN PATENT DOCUMENTS

| | | | | |
|---|---|---|---|---|
| JP | 54117622 A | * | 9/1979 | |
| JP | 61000879 A | * | 1/1986 | |
| JP | 63020996 A | * | 1/1988 | |
| JP | 2002344901 A | * | 11/2002 | |
| KR | 1998-069843 | | 10/1998 | |
| KR | 10-2007-0048570 | | 5/2007 | |

OTHER PUBLICATIONS

Korean Office Action dated Feb. 25, 2008 for corresponding Korean Patent Application 10-2007-0059320.

*Primary Examiner* — Tsung-Yin Tsai
(74) *Attorney, Agent, or Firm* — James P. Muraff; Neal, Gerber & Eisenberg LLP (57) ABSTRACT

Disclosed are a chain code generating apparatus and a method thereof. In accordance with an embodiment of the present invention, the chain code generating apparatus can include an image input unit, receiving an image signal from a camera and converting the received image signal to a digital image signal, and separating a synchronizing signal from the digital image signal and outputting the synchronizing signal; an image storing unit, storing image data corresponding to an active image section of the digital image signal in units of frame based on the synchronizing signal; and a code generating unit, reading the image data stored in the image storing unit and performing an outline search of the analysis portion, and generating a chain code according to a correlation between adjacent pixels forming an outline of the analysis portion in accordance with the searched result.

20 Claims, 9 Drawing Sheets

(1 of 9 Drawing Sheet(s) Filed in Color)

U.S. PATENT DOCUMENTS

| | | | |
|---|---|---|---|
| 5,832,141 A * | 11/1998 | Ishida et al. | 382/298 |
| 5,848,185 A * | 12/1998 | Koga et al. | 382/173 |
| 5,946,419 A * | 8/1999 | Chen et al. | 382/243 |
| 2002/0044689 A1 * | 4/2002 | Roustaei et al. | 382/199 |
| 2002/0141731 A1 * | 10/2002 | Elberbaum | 386/46 |
| 2004/0240855 A1 * | 12/2004 | Kagle | 386/96 |

\* cited by examiner

| 5 | 6 | 7 |
|---|---|---|
| 4 | C | 0 |
| 3 | 2 | 1 |

FIG. 7

|   | 0 | 1 | 2 | 3 | 4 | 5 | 6 | 7 | 8 | 9 | 10 | 11 | 12 | 13 | 14 |
|---|---|---|---|---|---|---|---|---|---|---|----|----|----|----|----|
| 0 |   |   |   |   |   |   |   |   |   |   |    |    |    |    |    |
| 1 |   |   |   |   |   |   |   |   |   |   |    |    |    |    |    |
| 2 |   |   |   | 0 | 0 | 0 | 0 | 0 | 0 | 0 | 0/3 | 0/4 | 0/4 | 4 |   |
| 3 |   |   |   | 6 |   |   |   |   |   | 2 |    |    |    |    |   |

FIG. 9

APPARATUS AND METHOD FOR GENERATING CHAIN CODE

CROSS-REFERENCE TO RELATED PATENT APPLICATIONS

This application claims the benefit of Korean Patent Application No. 10-2007-0059320, filed on Jun. 18, 2007, in the Korean Intellectual Property Office, the disclosure of which is incorporated herein in its entirety by reference.

BACKGROUND OF THE INVENTION

1. Field of the Invention

The present invention relates to a chain code generating apparatus and a method thereof, more specifically to a chain code generating apparatus and a method thereof that can generate a chain code in real time by performing an outline search of an analysis object in an input image.

2. Background Art

In some industrial fields, their own functions can be performed enough by using only binary images having two pixel values instead of color images or gray scale images which require a lot of memories and large bandwidths. For example, their own processes can be executed in the fields of character recognition, photographed images of a printed circuit board and medical images such as X-ray. In these fields, using the binary image having two pixel values makes it possible to analyze interest information in order to perform desired functions such as character recognition, error-checking of a printed circuit board and part-recognition of factorial assembling line.

Such a binary image system can use fewer memories than color images or gray scale images and employ intuitive algorithms. Also, the binary image system can be processed by using easy logic operations instead of complex logic operation, which results in the quick operation speed. This is because the binary image system has been still popular in the general industrial fields although today's computing system is dramatically developed.

In particular, the binary image system is more useful in the system environments which can be controlled to allow an object and surroundings to be easily separated. The environment separation can be easily performed by allowing the number of objects of an image to be limited and adequately controlling lightings of the system environment. For example, since the lighting control and the number adjustment of the objects included in the image are very simple things, the binary image system is very popular in the actual industrial spots such as factories.

In the binary image, the most important items of information are the shape, position and direction of an object portion (i.e. a portion occupied by an object in an image). These items of information can be extracted by using outline information related to a part in which a pertinent object is in contact with its surrounding. Accordingly, it is unnecessary to use overall image information in order to analyze an analysis object in a binary image, but using the outline information can perform the analysis of the analysis object efficiently.

In other words, the processed result can be acquired more quickly although fewer system resources such as memories and CPUs are used. Accordingly, the application field based on the binary image does not use the binary image itself as it is for the image analysis but convert the form of outline information of the analysis object in the binary image to a suitable form to use the binary image.

A chain code method is one of the well-known methods for representing outlines. A chain code codes the relation between each pixel forming the outlines of an analysis object in an image to represent the analysis object. Here, the relation between each pixel is referred to as the position correlation between a current pixel and a next-searched outside pixel, which form the outline.

By using the chain code, it is possible to recognize the position correlation between each of the pixels which start from a start point pixel of the analysis object and arrive at the start point pixel according to the outline of the analysis object. Inversely, since the chain code has information related to the position correlation between each pixel included in the outline of the analysis object as described above, the origin binary image can be recovered from the chain code.

In the conventional art, one image processing system generates a chain code and analyzes the generated chain code. In other words, even through generating the chain code and analyzing the generated chain code does not belong to the main work of the image processing system that performs the general imaging processing of an input image but merely belong to an additional work of the image processing system, it consumes too more system resources than needs to allow the single image processing system to process the two operations.

This requires a chain code generating apparatus, which can reduce the processing road of an image processing system from the viewpoint of a general system by allowing a separately mounted compact hardware device to execute the processes of converting an inputted original image to a binary image and acquiring a chain code from the binary image.

As such, if the separately mounted compact hardware device is allowed to quickly generate a chain code, the image processing system can concentrate its system resources on an upper algorithm and complex image processing operations by using the chain code. Accordingly, the system can more efficiently perform the processing operations.

SUMMARY OF THE INVENTION

Accordingly, the present invention provides a chain code generating apparatus and a method thereof that can generate a chain code of an analysis object from an input image by using a compact hardware device, to thereby reduce the system load of the general image processing system and to maximize the efficiency.

The present invention also provides a chain code generating apparatus and a method thereof that can have the quicker processing time by using a parallel storing method of alternatively storing a real-time-inputted image in two buffer memories in units of frame.

The present invention also provides a chain code generating apparatus and a method thereof that can improve the image transmitting speed and efficiently use transmitting bandwidth by transmitting a real-time-generated chain code by use of a typical communication protocol.

An aspect of the present invention features a chain code generating apparatus for generating a chain code of an analysis object of an image. The chain code generating apparatus can include an image input unit, receiving an image signal from a camera and converting the received image signal to a digital image signal, and separating a synchronizing signal from the image signal and outputting the synchronizing signal; an image storing unit, storing image data corresponding to an active image section of the digital image signal in units of frame based on the synchronizing signal; and a code generating unit, reading the image data stored in the image storing unit and performing an outline search of the analysis portion, and generating a chain code according to a position correlation of adjacent pixels forming an outline of the analysis portion in accordance with the searched result.

Here, the image input unit can include an image converting unit, converting the image signal to the digital image signal; and a signal separating unit, separating a synchronizing signal from the digital image signal and outputting the synchronizing signal.

The image converting unit can convert the image signal to the digital image signal having any one format of a color image signal, a gray scale signal and a binary image signal. At this time, the image converting unit can further include a binary image converting unit, converting the image data stored in the image storing unit to binary image data and transfers the binary image data to the code generating unit if the digital image signal converted by the image converting unit has a different format from the binary image signal.

The image storing unit can include the image storing unit comprises: a first buffer memory and a second buffer memory. Here, the image data can be alternately stored in the first buffer memory and the second buffer memory whenever a frame is changed.

If any one of the first buffer memory and the second buffer memory is storing the image data, the code generating unit can read the image data stored in the other of the first buffer memory and the second buffer memory to generate the chain code.

The outline search performed by the code generating unit can start from a pixel firstly encountered according to an input order of the image data in the analysis portion as a start point and can be continued until a closed curve is formed by outside pixels of the analysis portion.

Here the closed curve can be formed by the outside pixels by consecutively adding the outside pixels found from the start point one by one. Here, the one-by-one-consecutively-added outside pixel can be determined as a pixel of the analysis portion firstly found in a predetermined direction among 8 directional adjacent pixels about a currently found outside pixel.

The position correlation of the adjacent pixels can be determined according to a pertinent direction corresponding to a position of the consecutively-added outline pixel among the 8 directions about the currently found outline pixel.

The chain code generating apparatus can further include a code storing unit storing the chain code generated by the code generating unit. At this time, the code storing unit can store the chain code in a form of one-dimensional arrangement.

The chain code generating apparatus can further include a transmitting unit transmitting the chain code to an outside.

Another aspect of the present invention features a method for generating a chain code of an analysis object of an image. The chain code generating method can include converting an image signal inputted from a camera to a digital image signal; separating a synchronizing signal from the digital image signal and outputting the synchronizing signal; storing image data corresponding to an active image section of the digital image signal in units of frame based on the synchronizing signal; and generating a chain code according to a position correlation of adjacent pixels forming an outline of the analysis portion by performing an outline search of the image data.

Here, the digital image signal converted through the step of converting the image signal to the digital image signal can have any one format of a color image signal, a gray scale signal and a binary image signal. At this time, the chain code generating method can further include converting the image data to binary image data and outputting the binary image data, after the step of storing the image data corresponding to the active image section and before the step of generating the chain code according to the position correlation of the adjacent pixels, if the digital image signal converted through the step of converting the image signal to the digital image signal has a different format from the binary image signal.

The chain code generating method can further include storing the chain code after the step of generating the chain code according to the position correlation of the adjacent pixels. In the step of storing the chain code, the chain code can be stored in a form of one-dimensional arrangement.

The step of generating the chain code according to the position correlation of the adjacent pixels can include determining a pixel of the analysis portion, first encountered according to an input order of the image data as an outside pixel and a reference pixel for the outline search; additionally determining a pixel of the analysis portion, firstly found in a predetermined direction from the reference pixel as another outside pixel of the analysis portion; re-determining the additionally determined outside pixel as another reference pixel; repeating the step of additionally determining the firstly found pixel of the analysis portion as another outside pixel and the step of re-determining the additionally determined outside pixel as another reference pixel until a closed curve is formed by outside pixels of the analysis portion.

Here, an outside pixel of the analysis portion added through the step of additionally determining the firstly found pixel of the analysis portion as another outside pixel, can be determined as any one pixel which is firstly recognized to pertain to the analysis portion in a clockwise or counterclockwise search, among 8 directional adjacent pixels about the reference pixel.

The position correlation of the adjacent pixels of the step of generating the chain code according to the position correlation can be determined according to a pertinent direction corresponding to a position of the consecutively added outline pixel among the 8 directions about the currently found outline pixel.

BRIEF DESCRIPTION OF THE DRAWINGS

The file of this patent contains one drawing executed in color. Copies of this patent with the color drawing will be provided by the Patent and Trademark Office upon request and payment of the necessary fee.

These and other features, aspects and advantages of the present invention will become better understood with regard to the following description, appended Claims and accompanying drawings where:

DESCRIPTION OF THE EMBODIMENTS

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments of the present invention will be described in detail with reference to the accompanying drawings.

Figure 1:
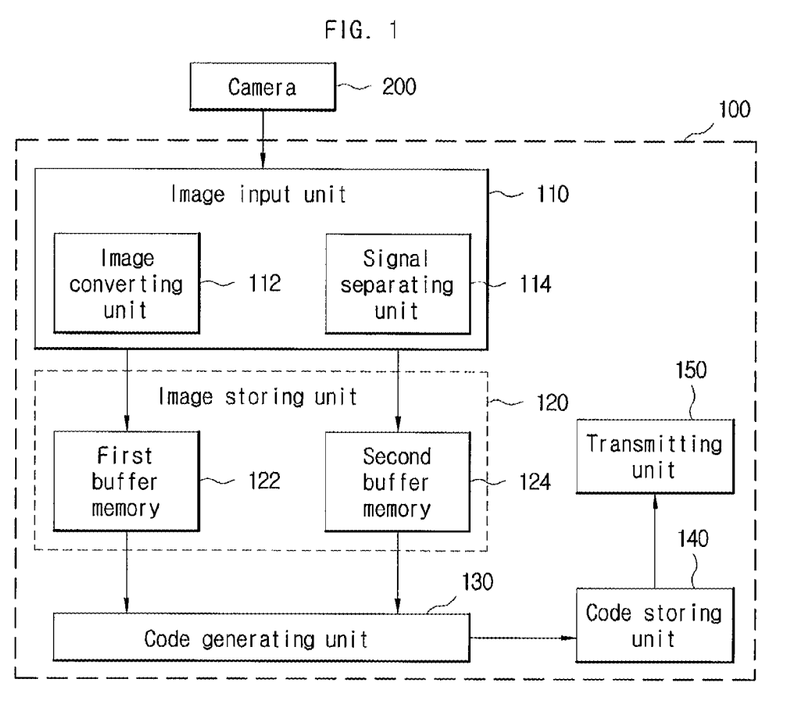
FIG. 1 illustrates the simple structure of a chain code generating apparatus in accordance with an embodiment of the present invention.
Figure 2:
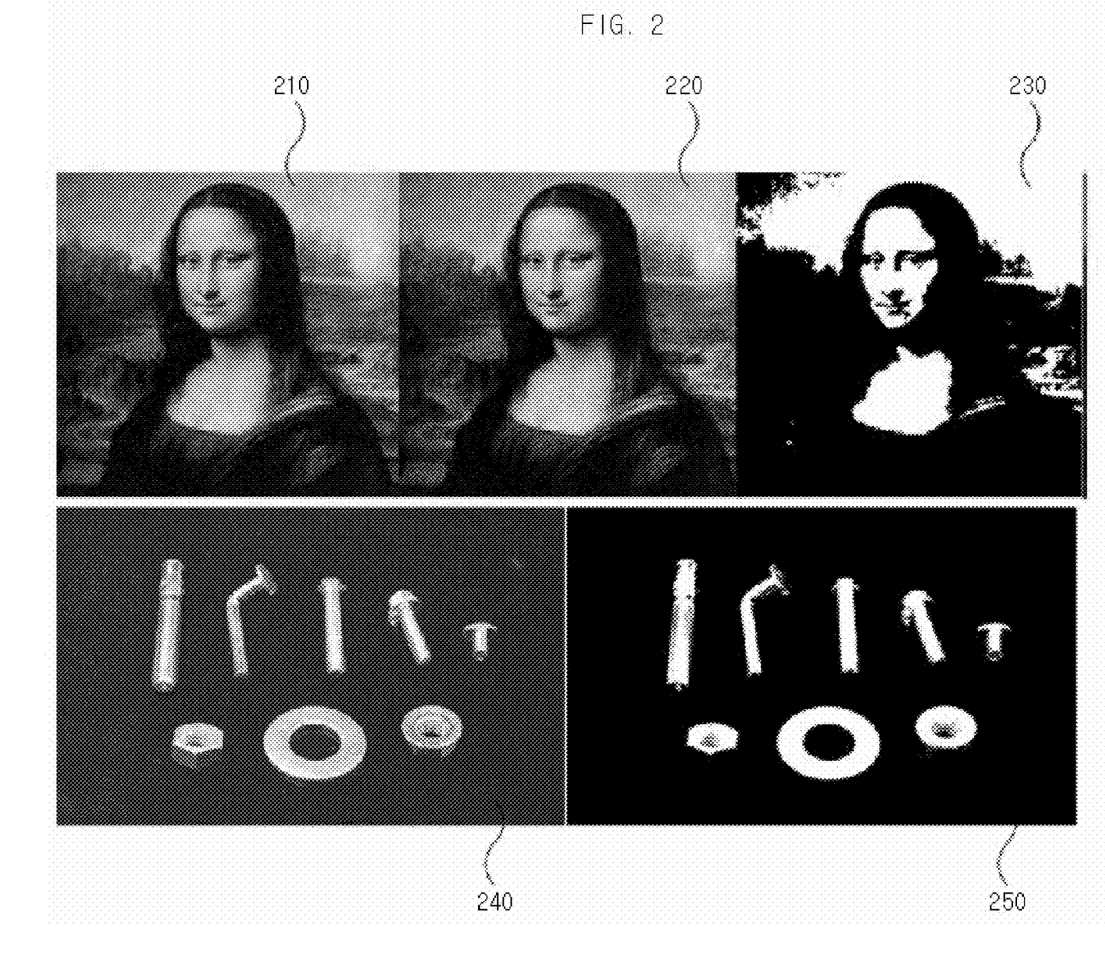
FIG. 2 illustrates a color image, a gray scale image and a binary image for the same image for mutual comparison.

FIG. 1 illustrates the simple structure of a chain code generating apparatus in accordance with an embodiment of the present invention, and FIG. illustrates a color image, a gray scale image and a binary image for the same image for mutual comparison.

Referring to FIG. 1, in accordance with an embodiment of the present invention, the chain code generating apparatus 100 can be configured to generate a chain code of an analysis portion of an inputted image. Herein, the chain code generating apparatus 100 can include an image unit 110, an image storing unit 120, a code generating unit 130, a code generating unit 140 and a transmitting unit 150. Here, the analysis portion can refer to the image portion occupied by an analysis object as the object, which a user desire to analyze in an input image.

Firstly, it is evidently shown that the above elements of FIG. 1 are merely distinguished per main function of each element. Accordingly, it must be clearly understood that at least two below-described elements can be realized as one element, or one below-described element can be divided into at least two elements per more detailedly divided function.

The image input unit 110 can receive an image signal from a camera 200 and convert the received image signal to a digital image signal. Then, the image input unit 110 can separate a synchronizing signal from the digital image signal to output the synchronizing signal. In particular, the image input unit 110 can firstly receive an image signal which a camera 200 outputs by photographing an outside object. At this time, the image signal outputted from the camera 200 can be one of various signals such as analog image signals and coded digital image signals according to the type of the used camera.

Accordingly, it may be required to convert the form of an input image signal inputted from the camera 200 to a form capable of being processed by the chain code generating apparatus 100 of the present invention in order to process the input image signal. Herein, the input unit 110 of the present invention can include an image converting unit 112 as shown in FIG. 1.

Here, the image converting unit 112 can convert the image signal inputted from the camera 200 to a digital image signal. At this time, the digital image signal converted by the image converting unit 112 can be a color image signal having the format such as RGB and YUV or a gray scale image signal converting a color image to a gray scale image. Alternatively, the digital image signal can be a binary image signal. Naturally, the image conversion has no limitation of formats.

Referring to FIG. 2, it can be recognized that the color image, the gray scale image and the binary image is clearly separated. A first image 210 and a fourth image 240 are examples of the color image. A second image 220 is an example of the gray scale image. A second image 230 is an example of the binary image.

As shown in FIG. 1, the image input unit 110 can also include an image separating unit 114. The image separating unit 114 can separate a synchronizing signal from an input image signal or a digital image signal converted by the image converting unit 112.

The separated synchronizing signal can include information related to the start and the end of an image frame and the start and the end of each line of one image frame in an input image. Using the separated synchronizing signal makes it possible to recognize the section of an active image of the input image.

Here, the active image section can include actually active image information or image data of an input image signal. In other words, since a transferred image signal can include a horizontal synchronizing signal, having information related to the start and/or the end of each line, and a vertical synchronizing signal, having information related to the start and/or the end of each frame it may be required to extract the section included with the actually active image data excluding the section included with the horizontal synchronizing signal and the vertical synchronizing signal (i.e. referred to as a blanking period or a flyback period).

For example, in the case of using an NTSC method, a camera may be required to actually output an output image signal having the resolution 780×525 in order to output a suitable active image having the resolution 640×480 for the standard.

As a result, an inactive image may be outputted in the remaining section excluding the 640×480 sized active image section in the 780×525 sized output image signal. Here, the remaining section can correspond to the horizontal-line-directional 140 pixels and the vertical-line-directional 45 pixels. The horizontal synchronizing signal can be loaded during the period of time as much as the 140 pixels, and the vertical synchronizing signal can be loaded during the period of time as much as the 45 pixels. Accordingly, image data corresponding to the active image section of the input image signal can be stored, and the image data can be converted to a chain code by using the synchronizing signal. In the present invention, the aforementioned processes can be performed by allowing the signal separating unit 114 to separate the synchronizing signal and the synchronizing signal to be transferred to each element of the present invention.

At this time, separating and outputting the synchronizing signal can be performed by the two following methods. A first passive method can analyze an image signal generated by the camera 200 to separate and output the synchronizing signal of the image signal. A second active method can transfer the synchronizing signal generated by the image input unit 110 to the camera 200 and control the camera 200 to photograph an object according to the transferred synchronizing signal before separating the synchronizing signal from an image signal outputted according to the photographed object and outputting the separated synchronizing signal.

In other words, the chain code generating apparatus 100 can be realized to separate the synchronizing signal by any one of the passive method and the active method.

The image storing unit 120 can store image data corresponding to an active image section of a digital image signal outputted from the image input unit 110 in units of frame. The active image section, as described above, can be stored in units of frame by using the synchronizing signal separated and outputted by the image input unit 110.

Here, the image storing unit 120 can be realized to include double buffer memories having a first buffer memory 122 and a second buffer memory 124. Below is described the benefit of the case that the image storing unit 120 is configured to include the double buffer memories.

While one memory is writing (or storing) data, the data stored in the memory is unable to be read. If another memory is further equipped, even though any one of two memories is writing data, the data stored in the other memory can be read.

For example, a chain code can be generated in real time from an image signal real-time-inputted from the camera 200 without cessation of the processing time by performing the chain code generating process by allowing the below-described code generating unit 130 to read the image data stored in the second buffer memory 124 while the first buffer memory 122 is writing the image data.

Accordingly, the first buffer memory 122 and the second buffer memory 124 can alternately store the image data corresponding to one image frame whenever the frame of the input image is changed.

At this time, the conversion between reading and writing according to the change of the image frame of the first buffer memory 122 and the second buffer memory 124 can be performed based on the vertical synchronizing signal of the synchronizing signal outputted from the image input unit 110 (more particularly, the signal separating unit 114).

Here, it is natural that the image data can be stored in the image storing unit 120 in a form of any one of color image data, gray scale image data and binary image data according to the format of the digital image signal outputted through the image input unit 110.

At this time, the color image can be typically formed by using combinations of red, green and blue colors in the case of the RGB format. The color image may need storing spaces as many as a total of 24 bits because 8 bits is required to be used per each color to represent 1-pixel data (i.e. a pixel value of 1 pixel). Also, since the gray scale image is represented as the change of brightness without the separation of colors, the gray scale image may need the storing space of 8 bits to store 1-pixel data.

Finally, since the binary image has the pixel value of 0 or 1, the binary image may need the storing space of 1 bit to store 1-pixel data. Accordingly, it can be preferable that the binary image is stored to reduce the used memories of the image storing unit 120 instead of the original color image or the gray scale image.

The code generating unit 130 can read image data stored in the image storing unit 120 and perform the outline search of an analysis object of an image in order to generate a chain code.

The image data inputted into the code generating unit 130 may be required to be binary image data as a precondition for allowing the code generating unit 130 to perform the outline search of an analysis object in the image.

Accordingly, in case that other image data is stored in the image storing unit 120 instead of the binary image data, a binary converting unit (not shown) can be placed between the image storing unit 120 and the code generating unit 130 to convert other image to binary image data before transferring the binary image data to the code generating unit 130.

$$I_T(x, y) = \begin{cases} 1 & \text{if } I(x, y) \in Z \\ 0 & \text{otherwise.} \end{cases} \quad \text{[Formula 1]}$$

$$B(x, y) = I_T(x, y)$$

In other words, if a 1 pixel is assumed to be placed at a coordinate value of (x, y) of an image, a threshold image (i.e. $I_T(x,y)$) can be acquired from an original image according to the result of a threshold operation for determining whether the pixel value (i.e. $I(x,y)$) of the original image for a 1 pixel pertains to a predetermined color portion (i.e. Z, for example, in the case of extracting a human face, the color portion corresponding to the flesh-color) or to the range of a predetermined desired brightness (or more than the desired brightness). As such, since the generated threshold image has the pixel of 0 or 1 according to the threshold operation of the forgoing method, it can be recognized that the threshold image is identical to a binary image (i.e. $B(x,y)$).

Through the description related to FIG. 8 and FIG. 9, the method of generating a chain code through the code generating unit 130 will be described later with reference to FIG. 3 through FIG. 7. At this time, the chain code generated by the code generating unit 130 can be temporarily stored in the code storing unit 140. Here, the code storing unit 140 can store the chain code transferred from the code generating unit 130 in a form of one-dimensional arrangement.

The chain code generating unit 100 of the present invention can further include a transmitting unit 150 for transmitting the chain code generated by the code generating unit 130 to an outside. For example, the transmitting unit 150 can convert the chain code, generated by the code generating unit 130 and temporarily stored in the code storing unit 140, to a suitable chain code for a predetermined communication protocol before transmitting the converted chain code. At this time, the transmitting unit 150 can support any communication protocols such as a USB type and a RD-232C type without specific restriction.

Hereinafter, the chain code generating method in accordance with an embodiment of the present invention will be described in detail with reference to FIG. 8 and FIG. 9. At this time, FIG. 3 through FIG. 7 can be referred to as necessary for the description of understanding.

Figure 3:
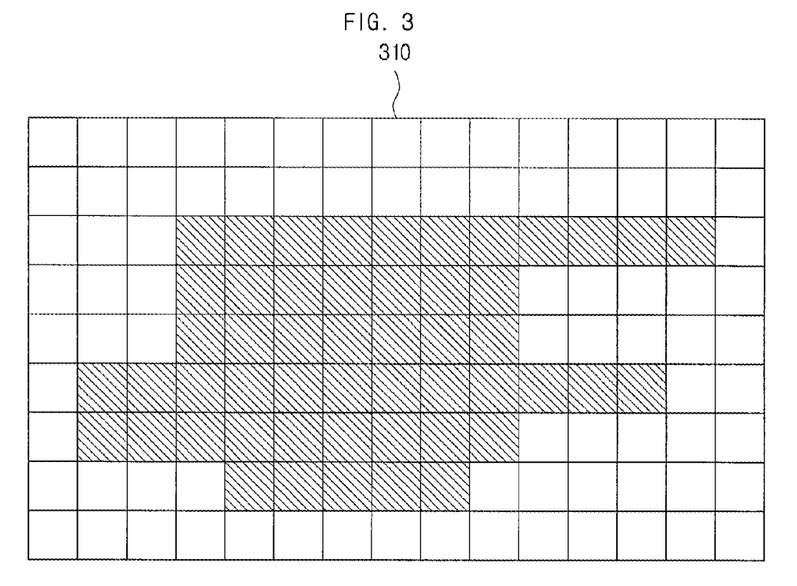
FIG. 3 illustrates an example of a binary image to which an input image is converted for the analysis of an analysis portion in the input image.
Figure 8:
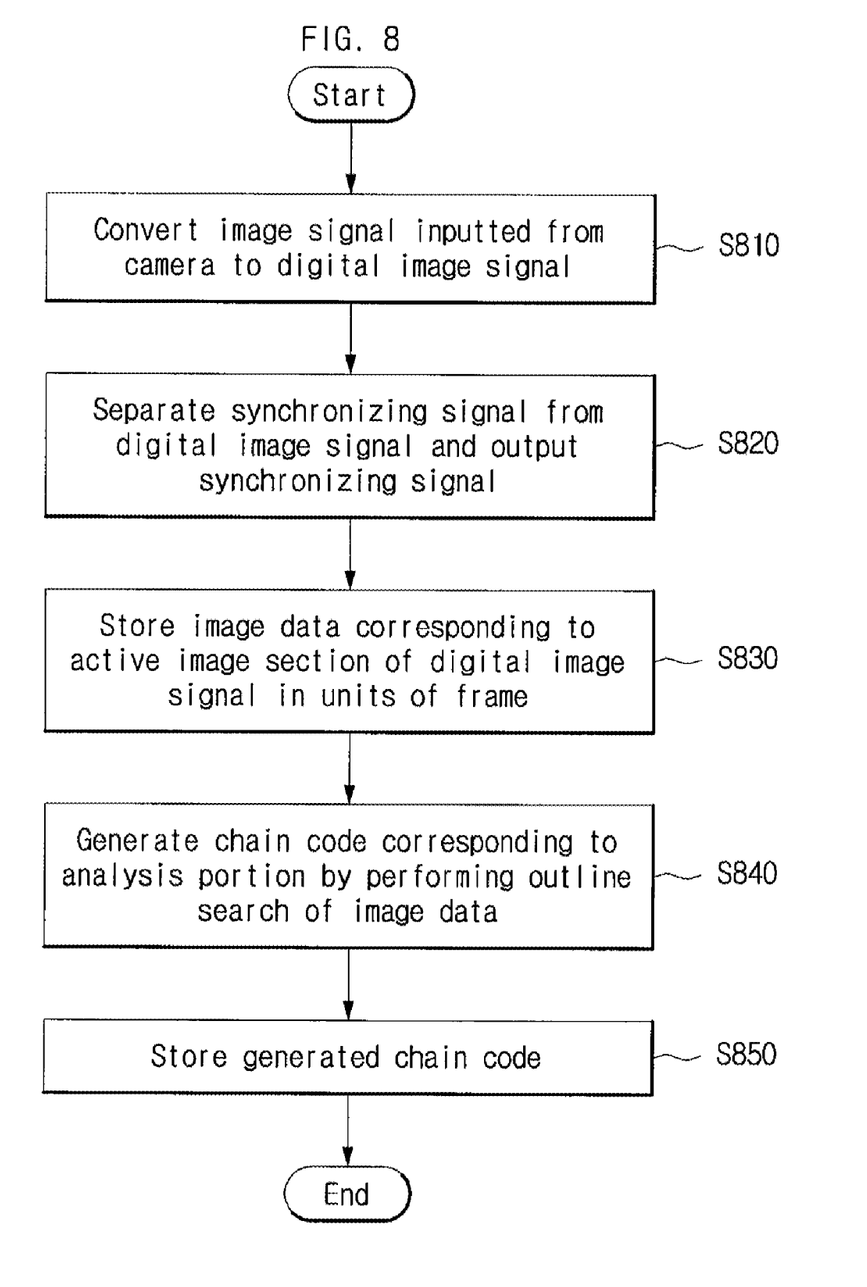
FIG. 8 is a flow chart illustrating a chain code generating method in accordance with an embodiment of the present invention.

Particularly, the binary image 310 of FIG. 3 is assumed to be identical to the binary image inputted into the code generating unit 130 through steps represented by S810 through S820 of FIG. 8. Also, it is assumed that one rectangular box of the binary image of FIG. 3 represents 1 pixel and a shadow portion is the portion occupied by an analysis object of a corresponding image, which is an analysis portion. At this time, the pixel value 1 is assumed to be allotted to each pixel corresponding to the analysis portion of the binary image, and the pixel value 0 is assumed to be allotted to each pixel corresponding to other surrounding portions.

Firstly, a step represented by S810 can convert an image signal inputted from the camera 200 to a digital image signal. This is to convert the form of the inputted image signal to the form of a signal capable of being processed by the chain code generating unit apparatus 100 (i.e. the digital image signal). The image converting unit 112 can perform the conversion as described with reference to FIG. 1.

Then, a step represented by S820 can separate a synchronizing signal from the digital image signal. The separation of the synchronizing signal can be performed by the signal separating unit 114. The reason that the synchronizing signal is separated is to extract an active image section including actually active image information or data of the inputted image signal.

Accordingly, a step represented by S830 is possible to store image data corresponding to the active image section of the inputted image signal by extracting the active image section by use of the synchronizing signal by the step represented by S820.

A step represented by S840 can allow the code generating unit 130 to generate a chain code corresponding to an analysis portion by performing the outline search of the image data stored in the image storing unit 120. The chain code generating method described through the foregoing steps will be described in more detail with reference to FIG. 9.

A step represented by S840 can store the chain code generated through the step represented by S840 in the code storing unit 140.

Figure 7:
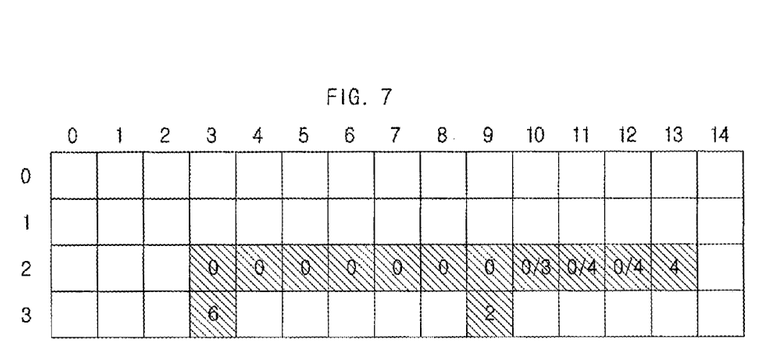
FIG. 7 illustrates a chain code generating operation of an analysis portion according to the direction information of FIG. 6.
Figure 9:
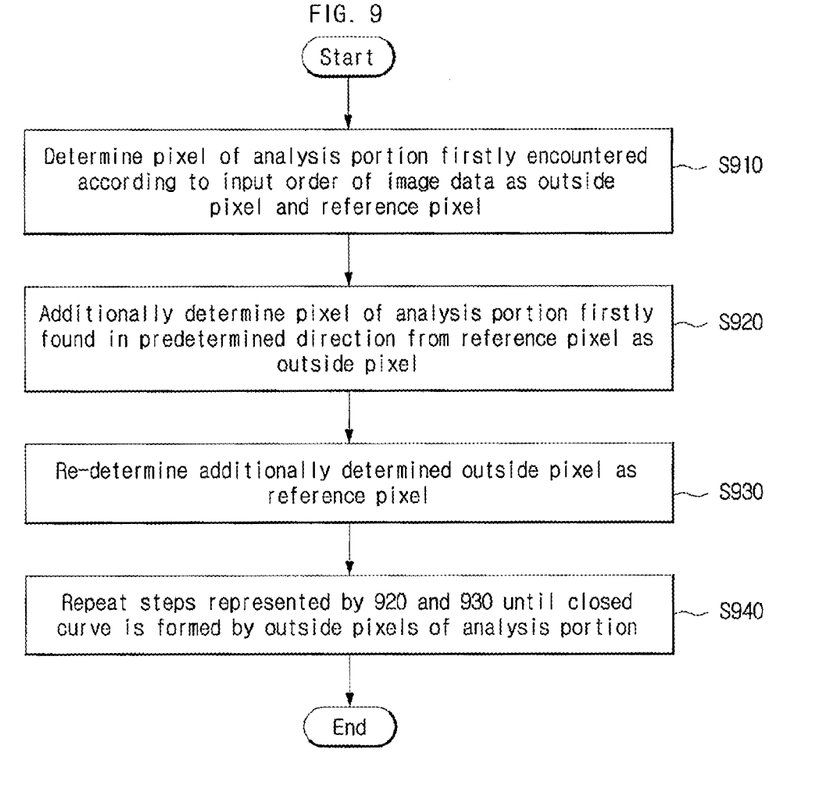
FIG. 9 illustrates a flow chart illustrating a chain code generating method using an outline searching method in more detail.

Referring to FIG. 9, a step represented by 910 can allow the code generating unit 130 to determine a pixel of the analysis portion firstly encountered according to an input order of image data (i.e. the pixel having the pixel value) as an outside pixel and a reference pixel for outline search. This will be described with reference to FIG. 7. FIG. 7 is a partial view illustrating a part A of the FIG. 5.

If it is assumed that the image data read by the code generating unit 130 is inputted in the input order of the direction from a left side to a right side and an upper side to a lower side, the pixel having the pixel value 1, placed at the coordinate value of (3, 2) can be firstly encountered according to the input order, in the case of the binary image of FIG. 7.

The pixel having the pixel value 1, firstly found in the search according to the input order of image data, can be considered as one of pixels forming the outside of the analysis portion. This can cause the pixel to be determined as an outside pixel. Also, the found pixel can be determined as a reference pixel in order to search a next outside pixel from the found pixel as the start point.

A step represented by S920 can determine a pixel of the analysis portion, firstly found in a predetermined direction from the reference pixel, as another outside pixel.

Figure 6:
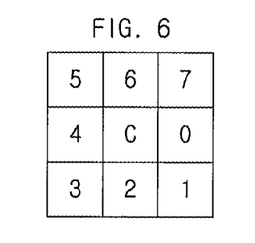
FIG. 6 illustrates an example of direction information as the standard for generating a chain code by a chain code generating apparatus in accordance with an embodiment of the present invention.

In other words, the pixel having the pixel value 1, firstly found in a predetermined direction, among 8 directional adjacent pixels about the reference pixel (i.e. the currently found outside pixel) (e.g. 8 directional adjacent pixels about the center pixel C of FIG. 6) can be determined as another outside pixel.

For example, the search, which is performed in a clockwise direction from the pixel (i.e. the coordinate value (2, 2)) left to the reference pixel (i.e. the coordinate value (3, 2)) for 8 directional adjacent pixels about the reference pixel of the coordinate value (3, 2), can be continued until the pixel having the pixel value 1 of the coordinate value (4. 2) is firstly found. At this time, the pixel having the pixel value 1, firstly found from the reference pixel is added as another outside pixel of the analysis portion.

The forgoing method of searching the outside pixel in a direction may be very useful. This is because in case that image data is successively inputted in the direction from a left side to a right side or from an upper side to a lower side, a pixel of the analysis object, firstly found in the pixel-by-pixel search of the adjacent pixels about the currently found outside pixel in the clockwise direction, can be considered as one of the pixels forming the outline of the analysis portion without doubt.

Of course, the method of searching the outside pixel in a direction can be set in various ways in the direction in which image data is inputted. In other words, in case that image data is successively inputted in the direction from a left side to a right side or from an upper side to a lower side, the search of the adjacent pixels can be alternatively performed in a counterclockwise direction.

A step represented by S930 can re-determine the output pixel additionally set by the prior step as another reference pixel for outline search. In other words, the step represented by 930 can allow the reference pixel to move on the position of another outline pixel additionally found through the prior step. Then, the outline search can be continuously performed based on the position of the re-determined reference pixel in the predetermined direction.

A step represented by S940 can repeat the steps represented by S920 and S930 until the outline search of the analysis object of the binary image is ended. Repeating the steps represented by S920 and S930 makes it possible to allow the outside pixel to consecutively be added one by one based on the position of each reference pixel continuously renewed according to the ongoing outline search. This can result in a closed curve consisting of the outline pixels of the analysis object. If the closed curve consisting of the outline pixels of the analysis object is formed, the outline search is completed.

Figure 4:
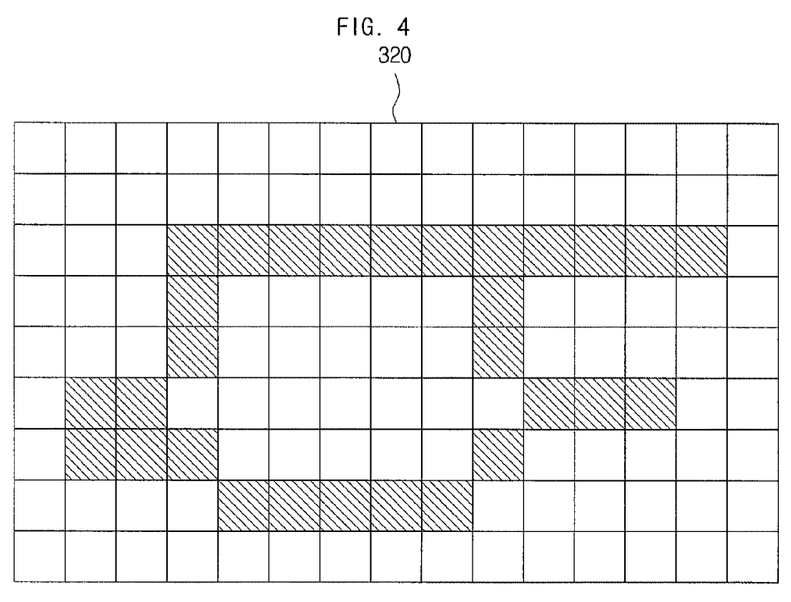
FIG. 4 illustrates an image according to the result of an outline search performed for an analysis portion in the binary image of FIG. 3.
Figure 5:
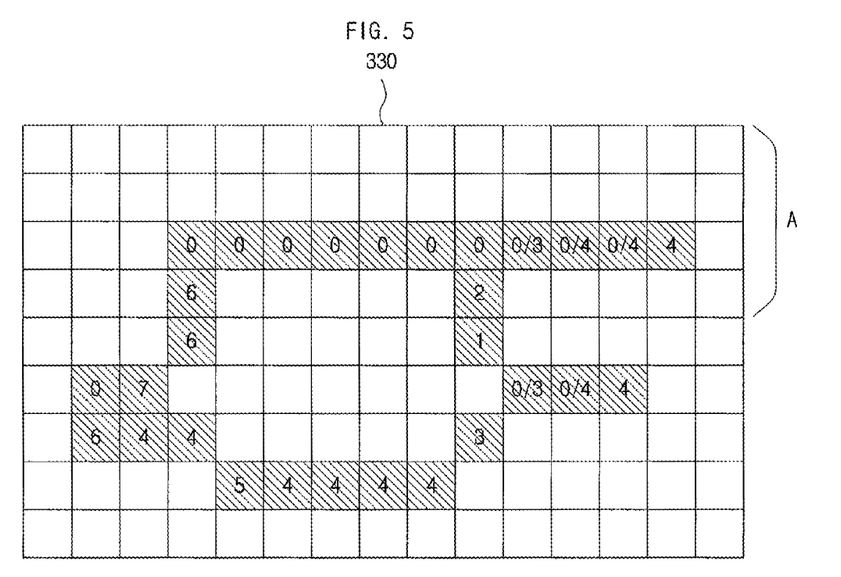
FIG. 5 illustrates a chain code acquired for an analysis portion by using the result of the outline search of FIG. 4.

As a result, a result image of FIG. 4 can be acquired from the binary image of FIG. 3. A chain code of the analysis portion can be generated together as shown in FIG. 5. This will be described with reference to FIG. 6 and FIG. 7. Here, FIG. 6 illustrates an example of direction information as the standard for the coding when a chain code is generated by using the outline-searched result.

Referring to FIG. 6, the numbers 0 through 7 can be assigned to each of 8 directional adjacent pixels about a reference pixel C (i.e. the currently found outline pixel). The numbers can be considered as kind of code numbers for generating a chain code according to the position correlation between the reference pixel and 8 directional adjacent pixels about the reference pixel. Using the code numbers makes it possible to code the position correlation between the currently found outside pixel and the consecutively and additionally found outline pixel for simple definition.

For example, in case that the pixel of the coordinate value (3, 2) as a first start point for the outline pixel in FIG. 7 is the reference pixel, a next outline pixel (i.e. the pixel of the coordinate value (4, 2)) is firstly found at the position corresponding to the position of '0' of FIG. 6 in a clockwise direction among 8 directional adjacent pixels about the reference pixel of the coordinate value (3, 2). Accordingly, the reference pixel of the coordinate value (3, 2) has the chain code of '0.' The additionally found outside pixel (i.e. the pixel of the coordinate value (4, 2)) is re-determined as the reference pixel according to the forgoing outline searching method. A next outline pixel is searched again based on the re-determined reference pixel.

At this time, in the case of the reference pixel of the coordinate pixel of (4, 2), a next outline pixel (i.e. the pixel of the coordinate value (5, 2)) is firstly found in the clockwise direction at the 1-increased position (i.e. the pixel position corresponding to '5' of FIG. 6) as compared with the previous reference pixel. Accordingly, the reference pixel of the coordinate value (4, 2) has the chain code of '0.'

Similarly, each later-additionally found outside pixel (i.e. the pixels of the coordinate values (5. 2) through (12. 2)) can have the chain codes of '0.' Then, in case that the pixel of the coordinate value (13, 2) is the reference pixel, since a next outside pixel (i.e. the pixel of the coordinate value of (12, 2)) is firstly found at the position corresponding to the position of '4' of FIG. 6, the chain code is '4.' Similarly to the pixel of the coordinate value (13, 2), in the case of the outside pixels of the coordinate values (12, 2) and (11, 2), the chain code is '4.'

As such, one chain code can be assigned to one pixel, at least two chain codes can be assigned to one pixel according to the position correlation between the pixel and its adjacent pixels. Finally, in case that the pixel of the coordinate value (10, 2) is the reference pixel, it can be recognized that since a next outside pixel (i.e. the pixel of the coordinate value of (9, 3)) is firstly found at the position corresponding to the position of '3' of FIG. 6, the chain code is '3.'

If the foregoing method is applied to the binary image of an inputted 1 frame, as illustrated in FIG. 5, the chain code of each of all pixels forming the outline of the analysis object can be generated.

Even though the chain code generating apparatus and the chain code generating method in accordance with the present invention have been described based on the case of applying to one analysis object in an image, it is natural that the present invention can be applied to at least two analysis objects in one input image.

For example, a method can give unique index values to each of at least two analysis objects in one image and complete generating a chain code of an analysis object having an index value before generate a chain code of an analysis object having a next index value. Another method can allow the chain code generating apparatus to have the parallel structure in order to simultaneously generate the chain code of each analysis object by being equipped with as many chain code generating apparatuses as the number of the analysis objects.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalent.

What is claimed is:

1. A chain code generating apparatus for generating a chain code of an analysis object of an image, the apparatus comprising:
an image input unit, receiving an image signal from a camera and converting the received image signal to a digital image signal, and separating a synchronizing signal from the image signal and outputting the synchronizing signal; an image storing unit, storing image data corresponding to an active image section of the digital image signal in units of frame based on the synchronizing signal; and
a code generating unit, reading the image data stored in the image storing unit and performing an outline search of the analysis portion, and generating a chain code according to a position correlation of adjacent pixels forming an outline of the analysis portion in accordance with the searched result;
wherein the chain coding can be realized to separate the synchronized signal by any one of a passive or an active image signal generation.

2. The chain code generating apparatus of claim 1, wherein the image input unit comprises:
an image converting unit, converting the image signal to the digital image signal; and
a signal separating unit, separating a synchronizing signal from the digital image signal and outputting the synchronizing signal.

3. The chain code generating apparatus of claim 2, wherein the image converting unit converts the image signal to the digital image signal having any one format of a color image signal, a gray scale signal and a binary image signal.

4. The chain code generating apparatus of claim 3, further comprising: a binary image converting unit, converting the image data stored in the image storing unit to binary image data and transfers the binary image data to the code generating unit if the digital image signal converted by the image converting unit has a different format from the binary image signal.

5. The chain code generating apparatus of claim 1, wherein the image storing unit comprises: a first buffer memory and a second buffer memory,
whereas the image data is alternately stored in the first buffer memory and the second buffer memory whenever a frame is changed.

6. The chain code generating apparatus of claim 5, wherein, if any one of the first buffer memory and the second buffer memory is storing the image data, the code generating unit reads the image data stored in the other of the first buffer memory and the second buffer memory to generate the chain code.

7. The chain code generating apparatus of claim 1, wherein the outline search performed by the code generating unit starts from a pixel firstly encountered according to an input order of the image data in the analysis portion as a start point and is continued until a closed curve is formed by outside pixels of the analysis portion.

8. The chain code generating apparatus of claim 7, wherein the closed curve is formed by the outside pixels by consecutively adding the outside pixels found from the start point one by one, whereas the one-by-one-consecutively-added outside pixel is determined as a pixel of the analysis portion firstly found in a predetermined direction among 8 directional adjacent pixels about a currently found outside pixel.

9. The chain code generating apparatus of claim 8, wherein the position correlation of the adjacent pixels is determined according to a pertinent direction corresponding to a position of the consecutively-added outline pixel among the 8 directions about the currently found outline pixel.

10. The chain code generating apparatus of claim 1, further comprising: a code storing unit storing the chain code generated by the code generating unit.

11. The chain code generating apparatus of claim 10, wherein the code storing unit stores the chain code in a form of one-dimensional arrangement.

12. The chain code generating apparatus of claim 1, further comprising: a transmitting unit transmitting the chain code to an outside.

13. A method for generating a chain code of an analysis object of an image, the method comprising:

converting an image signal inputted from a camera to a digital image signal;

separating a synchronizing signal from the digital image signal and outputting the synchronizing signal;

storing image data corresponding to an active image section of the digital image signal in units of frame based on the synchronizing signal; and generating a chain code according to a position correlation of adjacent pixels forming an outline of the analysis portion by performing an outline search of the image data; and wherein the chain coding can be realized to separate the synchronized signal by any one of a passive or an active image signal generation.

14. The method of claim 13, wherein the digital image signal converted through the step of converting the image signal to the digital image signal has any one format of a color image signal, a gray scale signal and a binary image signal.

15. The method of claim 14, further comprising: converting the image data to binary image data and outputting the binary image data, after the step of storing the image data corresponding to the active image section and before the step of generating the chain code according to the position correlation of the adjacent pixels, if the digital image signal converted through the step of converting the image signal to the digital image signal has a different format from the binary image signal.

16. The method of claim 13, further comprising: storing the chain code after the step of generating the chain code according to the position correlation of the adjacent pixels.

17. The method of claim 16, wherein, in the step of storing the chain code, the chain code is stored in a form of one-dimensional arrangement.

18. The method of claim 13, wherein the step of generating the chain code according to the position correlation of the adjacent pixels comprises determining a pixel of the analysis portion, first encountered according to an input order of the image data as an outside pixel and a reference pixel for the outline search;

additionally determining a pixel of the analysis portion, firstly found in a predetermined direction from the reference pixel as another outside pixel of the analysis portion;

re-determining the additionally determined outside pixel as another reference pixel;

repeating the step of additionally determining the firstly found pixel of the analysis portion as another outside pixel and the step of re-determining the additionally determined outside pixel as another reference pixel until a closed curve is formed by outside pixels of the analysis portion.

19. The method of claim 18, wherein an outside pixel of the analysis portion added through the step of additionally determining the firstly found pixel of the analysis portion as another outside pixel, is determined as any one pixel which is firstly recognized to pertain to the analysis portion in a clockwise or counterclockwise search, among 8 directional adjacent pixels about the reference pixel.

20. The method of claim 19, wherein the position correlation of the adjacent pixels of the step of generating the chain code according to the position correlation is determined according to a pertinent direction corresponding to a position of the consecutively added outline pixel among the 8 directions about the currently found outline pixel.

* * * * *